United States Patent [19]

Lemelson

[11] 3,871,758

[45] Mar. 18, 1975

[54] AUDIO-VISUAL APPARATUS AND RECORD MEMBER THEREFORE

[76] Inventor: Jerome H. Lemelson, 85 Rector St., Metuchen, N.J. 08840

[22] Filed: June 1, 1971

[21] Appl. No.: 148,513

Related U.S. Application Data

[63] Continuation-in-part of Ser. No. 14,751, Feb. 24, 1970, Pat. No. 3,582,201, which is a continuation-in-part of Ser. No. 518,685, Jan. 4, 1966, abandoned.

[52] U.S. Cl. .................. 353/19, 353/120

[51] Int. Cl. .................. G03b 31/06

[58] Field of Search .................. 353/15, 16, 17, 18, 19, 353/120; 274/13 A

[56] References Cited

UNITED STATES PATENTS

| | | | |
|---|---|---|---|
| 2,517,440 | 8/1956 | Kleber | 274/13 A |
| 2,683,390 | 6/1954 | Steele | 353/16 |
| 3,159,078 | 12/1964 | Schwartz | 353/19 |
| 3,504,445 | 4/1970 | Goldmark | 353/120 |
| 3,504,967 | 4/1970 | Hipp | 353/19 |
| 3,627,330 | 12/1971 | Dimitracopoules | 274/41.4 |

FOREIGN PATENTS OR APPLICATIONS

| | | | |
|---|---|---|---|
| 1,155,045 | 6/1969 | Great Britain | 353/19 |
| 1,568,950 | 4/1969 | France | 353/19 |

*Primary Examiner*—Louis R. Prince
*Assistant Examiner*—A. J. Mirabito

[57] ABSTRACT

An audio-visual apparatus for intermittently projecting still images of transparencies such as photographs and playing back accompanying audio recordings such as messages and descriptions of the projected information. The audio information is provided in the form of audio recordings on a spiral track of a first record disc which is driven at constant speed while a pick-up follows the spiral track and reproduces the recordings thereof which are fed to a speaker. The projected or directly viewed images are derived from transparencies in the form of individual frames or photographs secured to a second disc which is rotatably assembled with the first disc with both discs having the same axis of rotation. In one form of the invention, both the audio recordings and the transparent image frames may be selectively applied to their respective discs by the user who may also apply control signals to the audio disc for controlling the intermittent drive of the image frame containing disc. In another for both audio and video recordings are provided on a spiral track or tracks of the disc and novel means are provided for scanning same. Novel structures are presented in the record members.

4 Claims, 20 Drawing Figures

INVENTOR.

JEROME H. LEMELSON

INVENTOR.
JEROME H. LEMELSON

INVENTOR.
JEROME H. LEMELSON
BY

AUDIO-VISUAL APPARATUS AND RECORD MEMBER THEREFORE

RELATED APPLICATIONS

This is a continuation-in-part of Ser. No. 14,751 filed Feb. 24, 1970 for Audio-Visual Record Member and Playback Means Therefore now U.S. Pat. No. 3,582,201 said application being a continuation-in-part of Ser. No. 518,685 filed Jan. 4, 1966, now abandoned.

SUMMARY OF THE INVENTION

The instant invention relates to playback and projection systems, and more particularly to a novel means for storing sound and video information upon a disk, and apparatus for projecting and playing back said information.

Numerous systems presently exist in the art for playing back and displaying sound and video information, respectively. For example, in the motion picture projector field, it is conventional to provide a film strip having a multiplicity of image frame which are displayed at a predetermined number of frames per second with the retentivity of the human eye causing the changing image frames to convey smooth continuous movement of the subject matter contained within each image frame. A separate elongated sound track positioned adjacent the image frames cooperates with suitable playback means for producing the sound in the form of speech, music or other suitable sounds, which material is associated with the subject matter of the image frames being displayed. Such motion picture projection systems, however, are costly and rather tedious from the loading and unloading viewpoint. For example, the film strip is normally wound about a supply roll which is mounted upon a suitable spindle, whereupon the forward end of the film strip is threaded through a circuitous path including drive sprockets, a capstan, a light projection station, a playback capstan and recording head and a take-up reel.

Video tape systems are similarly arranged and also require a tedious loading and unloading procedure.

The instant invention is characterized by providing both sound and video information upon a single disk assembly which may be simply and readily positioned upon a rotatable turntable for playback and display purposes. Display and playback may be initiated immediately after positioning of a tone arm so that its cartridge stylus rides within the record sound groove for the purpose of playing back the sound stored therein, as well as for the purpose of guiding the tone arm having suitable optical scanning means, to follow image information stored in a spiral arrangement in the disk so as to be suitably projected upon a display screen.

It is, therefore, one object of the instant invention to provide a novel unitary disk assembly for storing both sound and video information.

Still another object of the instant invention is to provide novel apparatus for projecting and playing back image and sound information, respectively, stored within a novel unitary disk assembly.

These and other objects of the instant invention will be apparent when reading the accompanying description and drawings in which.

Figure 1:
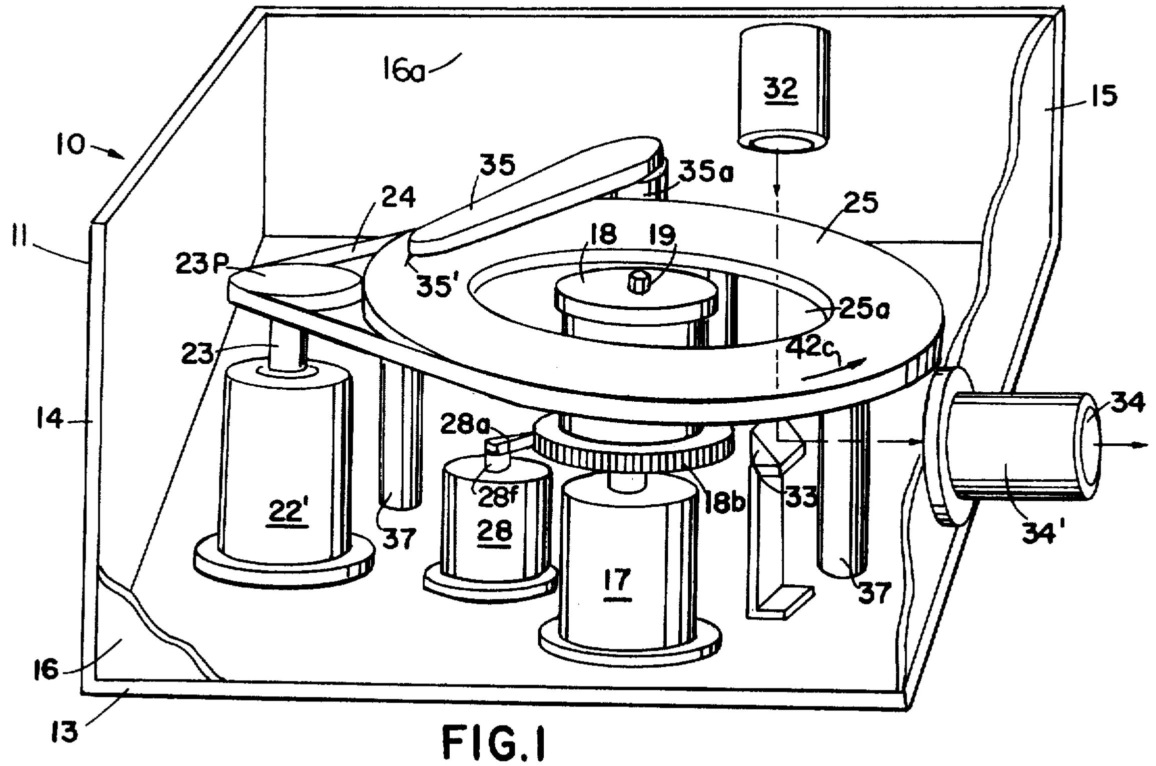
FIG. 1 is a perspective view of a combined display and playback means designed in accordance with the principles of the instant invention.
Figure 2:
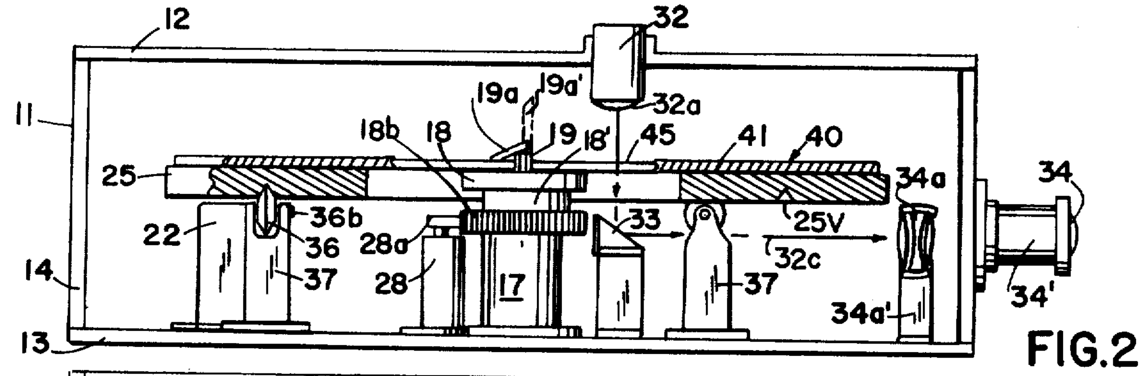
FIG. 2 is a sectional elevational view showing a portion of the display-playback means of FIG. 1.
Figure 2:
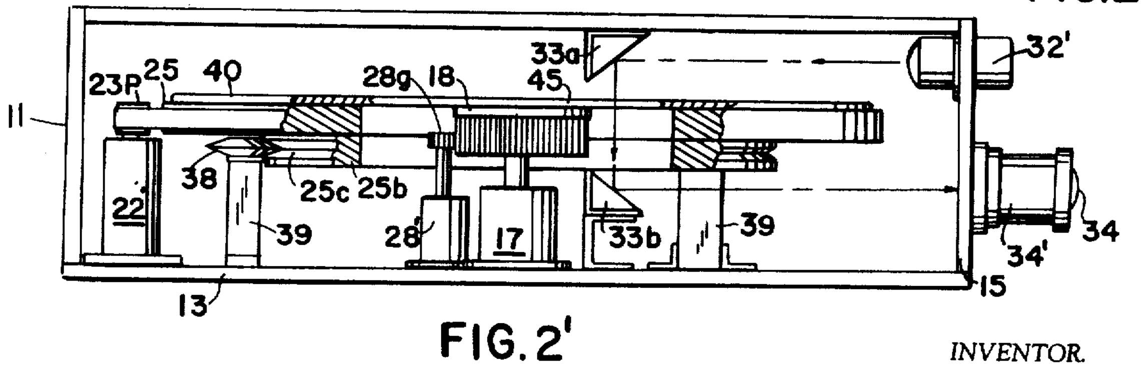
Figure 3:
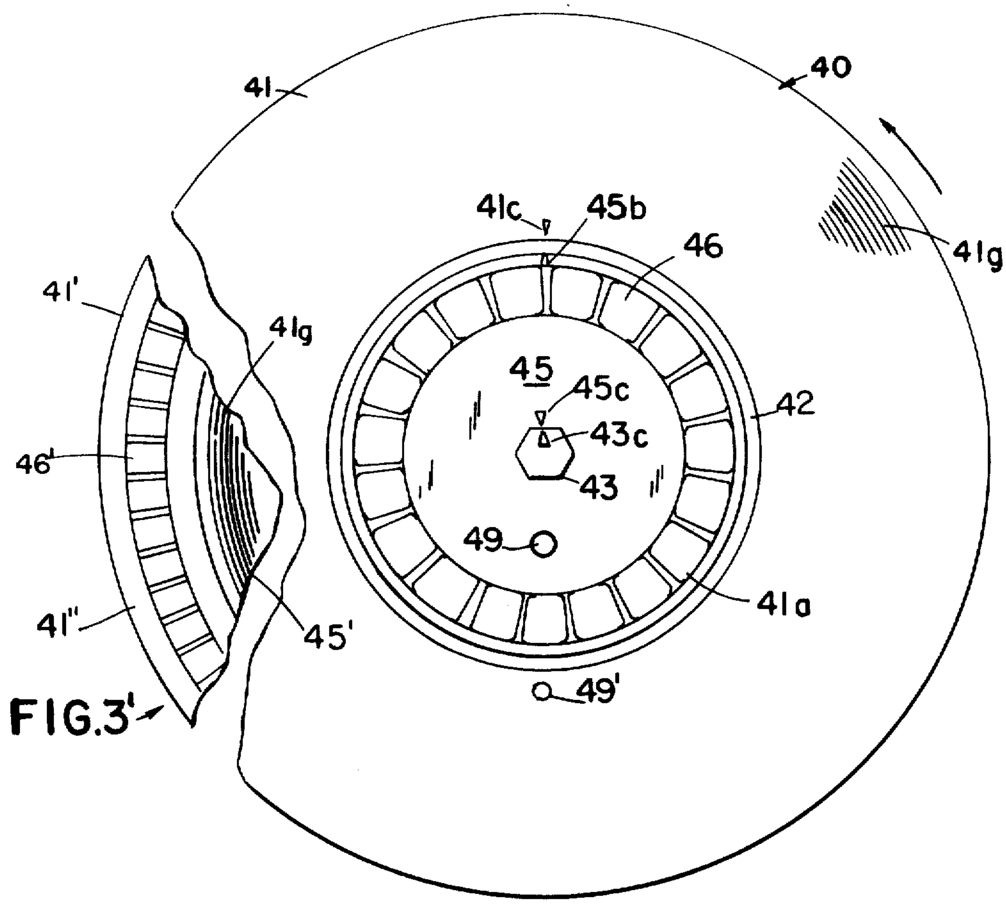
Figures 4, 5, 6, 7:
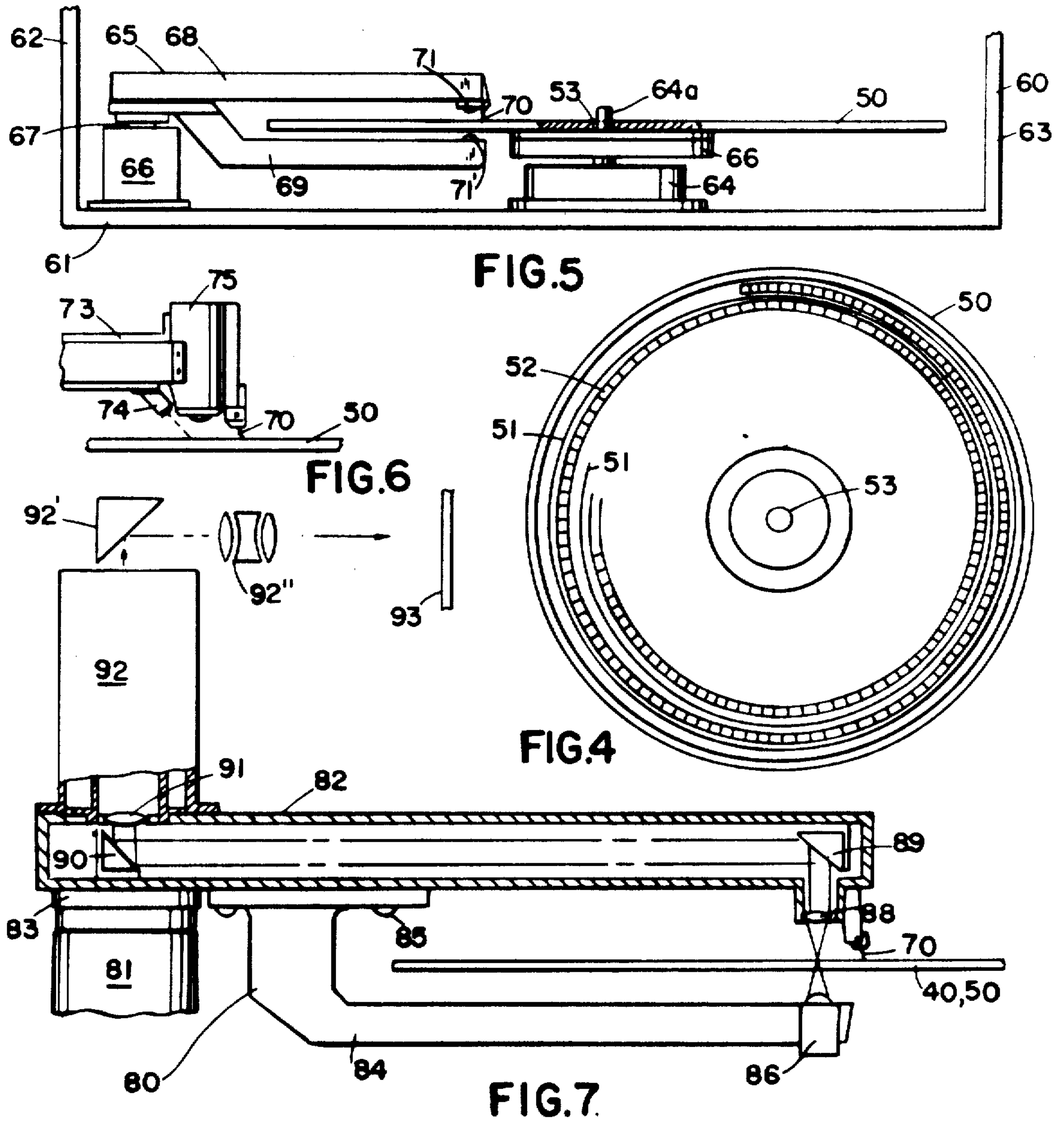
Figure 3A:
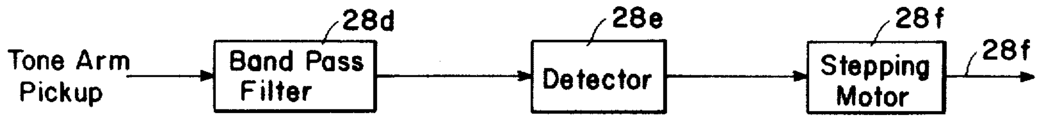

FIG. 2' is a schematic block diagram of the electronics employed for the purpose of operating the rotary stepping solenoid shown in FIG. 3;

FIG. 3 is a plan view of a record member for storing audio and visual information and which is designed for use with the display and playback means of FIGS. 1 and 2;

FIG. 3' is a fragmentary view of a modified form of the recording arrangement illustrated in FIG. 3;

FIGS. *3a*, *3b*, *3c* and *3d* are end cross-sectional views of different structures of disk records of the type shown in FIG. 3;

FIG. *3a'* is a schematic diagram of a detection circuit for control signals recorded on the audio track of a record member and employed to step the visual information containing track to effect the selective projection of images thereon in accordance with the audio recordings on the audio track;

FIG. 4 shows an alternative embodiment for the storage means of FIG. 3;

FIG. 5 is an elevational view of a playback-display means for use with the storage means of FIG. 4;

FIG. 6 shows a detailed view of a pickup mechanism which may be used as a substitute for that shown in FIG. 5;

FIG. 7 shows an alternative pickup means to that shown in FIGS. 5 and 6, and

Figure 8:
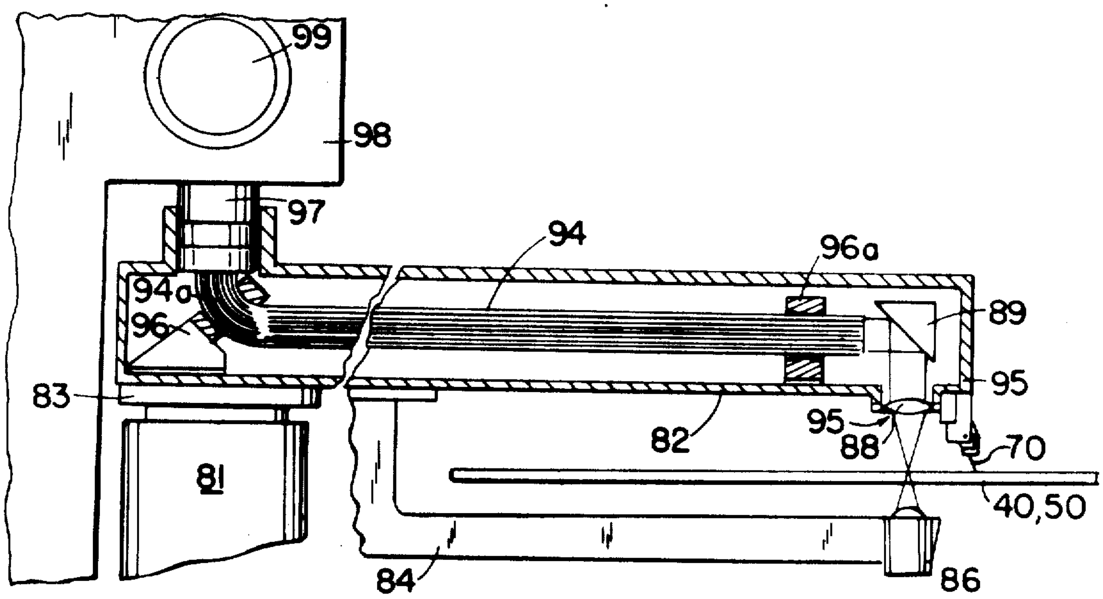
Figure 9:
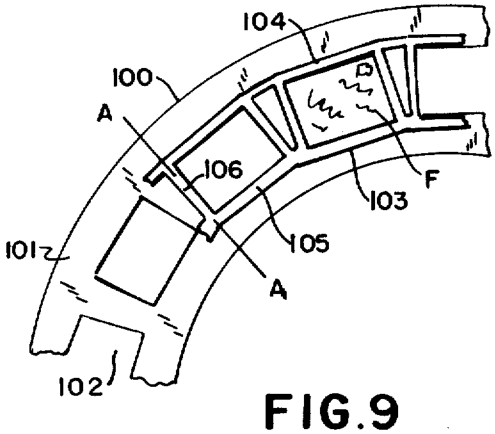
Figure 10:
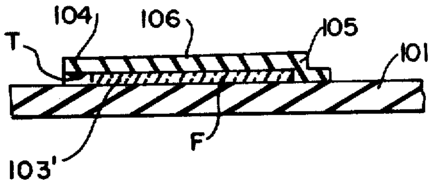
Figure 11:
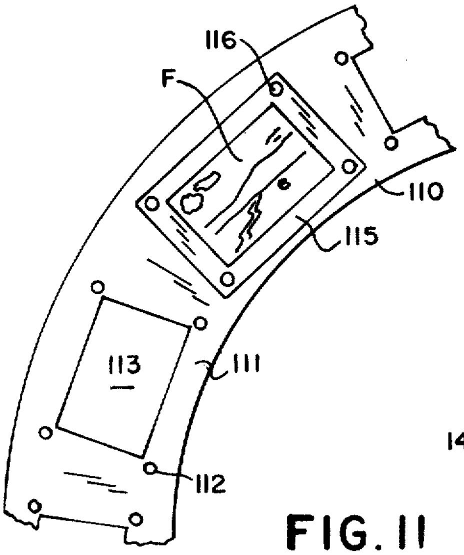
Figure 13:
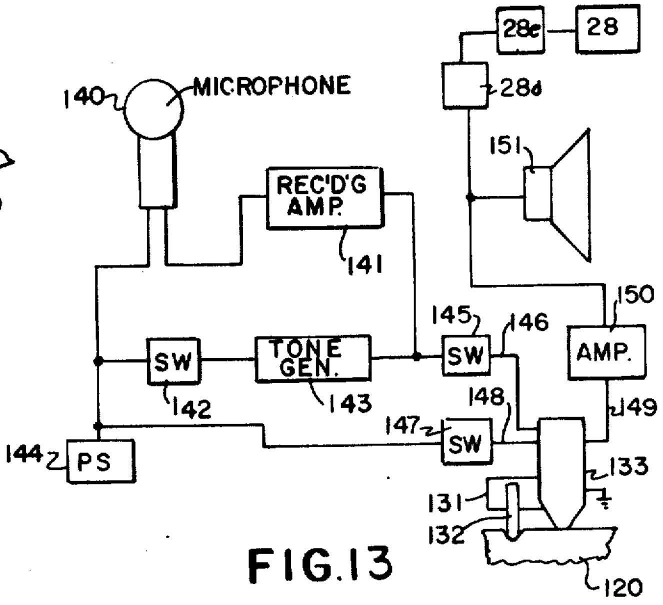
Figure 12:
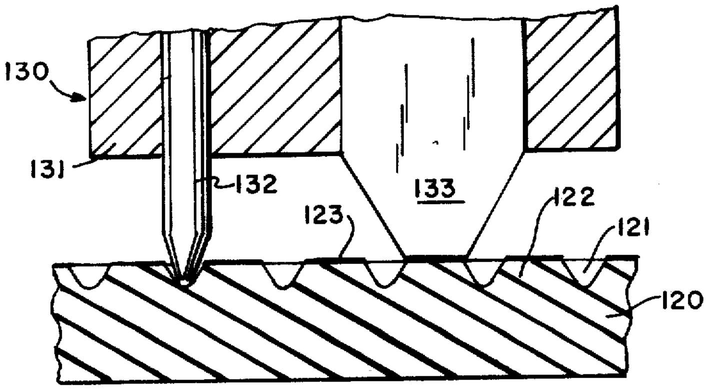

FIG. 8 is a side view with parts broken away for clarity of a modified form of the embodiment illustrated in FIG. 7;

FIG. 9 is a plan view of a fragment of a portion of a modified form of image frame retaining disc applicable to the record disc structures described;

FIG. 10 is a cross-sectional view taken along the line denoted A—A in FIG. 9;

FIG. 11 is a plan view of a fragment of a modified form of the disc shown in FIG. 9;

FIG. 12 is a view in cross-section of a fragment of a spiral track record disc showing a transducer and guide pin for guiding said transducer across the face of the disc as the disc rotates; and FIG. 13 is a schematic diagram of a system for recording on and monitoring signals picked up from a magnetic recording disc of the type shown in FIG. 12.

Referring now to the drawings, and more particularly to FIGS. 1 through 3, there is shown therein one preferred storage means and playback-display means, which devices have been designed in accordance with the principles of the instant invention. FIGS. 1 and 2 show an apparatus used for displaying and playing back visual and audio information contained in the storage means 40 shown best in FIGS. 3 and 2 (which shows a cross-sectional view of the embodiment of FIG. 3). In the form of record member shown in FIGS. 3 and *3e*. The storage means 40 is a substantially disk-shaped member having an outer portion 41 containing a spiral record groove *41g* in which audio information is placed in the typical fashion. It is well understood that the audio information may be music, speech, or other sound and any combination thereof.

The audio storage section (i.e., the outer disk member) 41 is provided with a concentric opening *41a*. The inner periphery of disk 41 surrounding opening *41a* is formed so as to provide a substantially V-shaped groove *41b* completely surrounding its inner periphery.

Groove 41*b* acts to position and support an inner record disk member 45 having a substantially circular-shaped periphery and being provided with a plurality of image frames 46 arranged in a circular array in close proximity to the outer periphery of inner record disk 45. The marginal portion of the outer periphery of disk 45 has a substantially arrow-shaped or V-shaped configuration 42*a* so as to be slidably received within the substantially V-shaped groove 42*b* of outer disk 41. Thus, it can be seen that the V-shaped groove 42*b* acts simply to retain inner disk 45 in a substantially coplanar relationship with outer disk 41, while, at the same time, allowing disks 41 and 45 to rotate independently of one another. Inner disk 45 is provided with a hexagonal-shaped opening 43 so as to be keyed to a spindle (which will be more fully described) for the rotation of disk 45. While a hexagonal-shaped opening is shown, it should be understood that any other polygonal-shaped opening such as a square, pentagon, octagon, etc., may be employed.

As it is preferred to provide speech or other audio recordings which describe or relate to the subject matter of the image frames 46, means are provided for keying the starting image frame with the sound recordings in the spiral grooves 41*g* of the outer record disc 41. Arrowheads or marks 41*c* and 41*b* are printed or impressed on discs 41 and 45 to be visually or automatically aligned prior to playback. An arrowhead 45*c* is also shown impressed in inner disc 45 to be keyed to a mark 43*c* stamped in the end of shaft 19 which shaft extends upwardly from an inner turntable 18 which supports the inner disc and will be more fully described.

The playback-display apparatus 10, shown in FIGS. 1–2, comprises a housing 11 having top and bottom walls 12, 13, rear and fron walls 14 and 15 and side-walls 16 and 16*a* portions of which walls are removed or broken away for clarity. The operating components of apparatus 10 constitute an inner turntable 18 having an upper surface designed to support the inner disc 45 and a separately rotatable outer turntable 25. The inner turntable 18 is mounted to shaft 19 of a bi-stable solenoid 17. The end of shaft 19 is shown hexagonally shaped so as to permit the similarly shaped opening 43 in the inner disc 45 to key the inner disc thereto for rotation with the inner turntable 18.

FIGS. 2 and 2' show different means for intermittently rotating the inner turntable to selectively position different image frames in the scanning field of the optical projection system. In FIG. 2 a pulse activated monostable rotary solenoid 28 has a finger 28*a* secured to the end of its output shaft which operates in the manner of a ratchet and pawl in engaging the teeth of a toothed wheel or gear 18*b* which is secured to the lower end of an extension 18' of the turntable 18. The bi-stable solenoid 17 is operative to raise and lower turntable 18 to permit retraction of the end 19' of shaft 19 below the level of the disc record member 40 permitting such records to be slidable advanced across the turntable without interference with the shaft during automatic record shanging operation. In FIG. 2' a pulse operated rotary stepping motor 28' has a pinion gear 28*g* connected to its shaft which engages the teeth of circular gear 18' secured below the turntable 18.

FIGS. 2 and 2' also show modified means for supporting and rotating the outer turntable 25 which is an annular disc-like member having an inner opening 25*a* providing clearance for the inner turntable 18 and serves to support and rotate the outer disc portion 41 of the storage device 40. In FIG. 2, a V-shaped groove 25V is provided as a circular track in the undersurface of the disc shaped outer turntable 25. The surfaces of the groove 25V ride against a plurality of V-shaped wheels 36 which are rotatably supported and equispaced around and below the turntable 25. The turntable 25 may be power rotated by frictional or toothed engagement of the peripheral surfaces of the wheels and the surfaces of the groove 25V. Notation 22 refers to a constant speed motor secured to the mount 37 which rotatable supports one of the wheels 36, the output shaft of which motor is connected to rotate said wheel for rotating turntable 25. In FIG. 2' the turntable 25 is provided with a downwardly directed shoulder 25*b* having a V-shaped groove 25*c* provided around its periphery. Rotatably mated in said groove are three or more V-shaped rollers 38 which are supported for rotation about vertical axes on respective mounts 39 secured to the bottom wall 13 and equispaced about the turntable. Rotation of the outer turntable 25 in FIGS. 1 and 2' is effected by a constant speed motor 22' which mounts a pulley 22P on its output shaft which drives a flexible belt 24 encircling the outer periphery of turntable 25 for frictionally rotating same as the motor operates.

Reproduction of the audio recordings from the groove of the outer record disc 41 is effected by a pickup tone arm 35 which may be of conventional design having a needle 35' riding in the record groove and pivotally supported on a suitable mount 35*a* secured to housing 11 and manually or automatically positioned with respect to the record disc by conventional record playback means.

FIGS. 2 and 2' also illustrate different forms of the projection system for the images recorded on the inner disc 45. In FIG. 2, projection light from a suitable source is emitted from a housing 32 secured to wall 12 and containing a condensing lens system 32*a* for focusing light therefrom upon the image frame of the array of frames on said inner disc member 45 which is aligned with the axis of said lens system. Whereas in FIG. 2 the light source housing 32 is disposed against and supported by the top wall 12 of the housing 11 to direct the properly focused light normal to the surface of the image frame aligned therewith, in FIG. 2' the light source housing 32' is supported by the side wall 15 of the playback and projector housing 11 and is adapted to direct light parallel to the face of the record disc 40 against a first mirror or prism 33*a* supported by the top wall 12 of housing 11 and positioned in alignment with the described circular array of image frames 46 so as to direct light from said light source in housing 32' perpendicularly to and through the image frames. A second mirror or prism 33*b* is positioned beneath the turntables on a mount supported by the bottom wall 13 of the housing 11 and is adapted to direct the light modulated in passing through the image frame parallel to the bottom surface of the turntable 25 to a projection lens system 34 mounted in a housing 34' supported by the side wall 15.

Projection light may comprise a source of suitable incandescent light or a laser located in the described housings and operative to direct an intense projection light beam directly through the image frames or film strip located on the inner disc 45 and/or against suitable optical components disposed adjacent the annular spacing 25*a* between the turntables 18 and 25. The light source housing and projection lens system housing may also be provided in direct alignment with each other. In other words, the described mirrors and/or prisms may be eliminated from the illustrated optical systems by disposing the projection lens system 34 against the bottom wall 13 in direct alignment with with the light source housing mounted to the top wall 12 for projecting image light perpendicular to said walls. Turning again to FIG. 2. The light rays are directed downardly, as shown by arrow 32*b*, so as to pass through the image frame to be displayed and to impinge upon a prism 33 positioned beneath inner disk 45 and in the region between inner turntable 18 and outer turntable 25.

Prism 33 causes the light rays to be deflected and to move in the horizontal direction, as shown by arrow 32*c*, so as to pass through and be focussed by projection lens system 34 and subsequently to be displayed upon a suitable projection screen (not shown). An additional lens system 34*a* may be provided in the region between prism 33 and projection lens 34. In FIG. 8 the hexagonal shaft 19 is provided with a pivotally mounted arm 19*a* which may be rotated from the dotted position 19*a'* to the solid line position 19*a* so as to rigidly hold inner disk 45 against the upper surface 18*a* of turntable 18 upon operation of solenoid 17. The operation of the embodiment of FIGS. 1 through 3 is as follows:

The disk assembly 40 is positioned upon the inner turntable with the toggle arm 19*a* in the dotted line position 19*a'*. The disk 45*a* is positioned upon shaft 19 so that its locating arrowhead 45*c* is in alignment with a similar arrowhead 19*b* provided on the surface of the hexagonal-shaped shaft 19. By cooperatively aligning the elements 19 and 45, this insures that the first image frame of the image frame series to be projected will be positioned within the projection field of the projection system.

The disk assembly 40, which may be "cut" so as to contain all descriptions of the subject matter being displayed by means of the projection system, will then begin to describe subject matter being so displayed. It should be understood that the amount of descriptive material relative to each image frame to be projected may be variable and the descriptive material for each image frame may be selected dependent only upon the needs of the user.

Considering FIG. 3 for the moment, let it be assumed that the tone arm started at position 42*h* of the spiral record groove 42 and that the oral material has now been played relating to the image frame being projected, for example, image frame 46', so that the needle of the tone arm is now in position 42*b*.

Figures 3A, 3B, 3C:
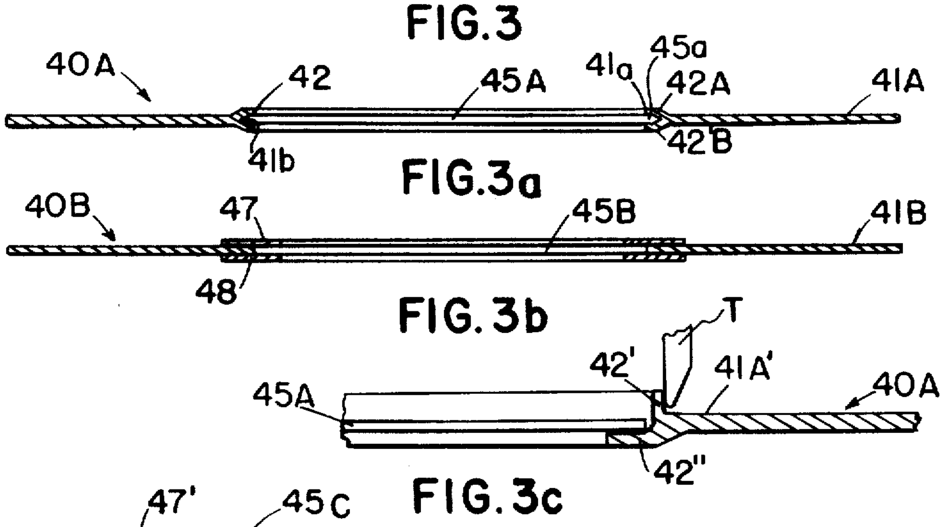

Let it further be assumed that the disk assembly 40 is rotating in the direction shown by arrow 42*c*. The needle will thus pass over the section 42*d* of the spiral record groove which is preferably a short section having a substantially high frequency tone recorded therein. This tone might be of the order of 17,500 cycles per second, for example, which tone is of a sufficiently high frequency so as not to be normally discernible by the average listener, while, at the same time, providing a suitable signal for operating stepping relay 28. As shown in FIG. 3*a*, for example, the output signal from the tone arm is impressed upon a band-pass filter which may, for example, be tuned to pass a signal of 17,500 cycles per second. When this signal is received, the band-pass filter impresses its output upon a detector circuit 28*e* which provides a d-c output signal of sufficient magnitude and duration for operating stepping relay 28 so as to cause its mechanical output 28*f* (i.e., its armature) to advance inner disk 45 by an amount sufficient to position the next image frame within the projection system for display thereof. Whereas it may be true that the speech or other sounds recorded within the spiral record groove 42 may generate harmonics which will lie in the range of 17,500 cycles per second, it should be understood that these tones will be quite transient in nature, and thereby insufficient to develop a signal of suitable magnitude and duration at the output of detector 28*e* for operating relay 28. Such high frequency signal sections as the sections 42*d* will be positioned immediately after each descriptive sound portion related to an image frame has terminated so that the inner turntable may be stepped to project the next image frame to be orally described.

Suction means may be employed to hold the inner disc 45 of FIG. 3 as may an offset key or pin means projecting upwardly from the center turntable be operative to cooperate with a center pin means in retaining a disc with a circular opening or round hole at its center provided with auxiliary means, such as the illustrated offset hole 49 is provided in the disc 45 to permit it to be gripped and rotated on turntable 18 without slipping. The outer annular disc 41 containing the audio recording 41*g* also is provided with a small hole 49' therethrough suitably located near the inner periphery thereof to be engaged by a pin projecting outwardly from an outer turntable (to be described) which supports and rotates said outer disc.

The record disc assembly 40 of FIG. 3 may be modified as to the illustrated relative diameters of the inner and outer disc members. It is also noted that the image frames 46 may be disposed on or in the outer disc member as illustrated in FIG. 3' while the spiral record groove is provided on the inner disc member 45' which is rotated at constant speed while the outer disc, which is denoted 41' in FIG. 3, is rotationally stepped to bring selected image frames into the properly placed scanning field of an optical projection system by rotating means such as described applied to the respective turntables. In other words, the intermittent driving means 28 would be applied to rotate the outer turntable 25 while a constant speed motor is operative to drive the inner turntable 18.

Further structural details of several embodiments of a record disc of the type shown in FIG. 3 are illustrated in FIGS. 3*a* to 3*d*. Disc 40A of FIG. 3*a* comprises an annular record bearing plate or sheet-like portion 41A, the inside periphery of which is formed with a circular channel or V-shaped groove 42 defined by a pair of circular lip-like formations 42A and 42B each extending outwardly from a respective side of the disc which define a track or guide for the inner disc member 45A which may rotate freely therein. Formations 42A and 42B may be welded to the annular disc 41A or molded integral therewith with either or both formations 42A and 42B of such a shape and dimension as to permit the peripheral edge portion inner disc member 45A to be "snapped" into the circular groove 42 by deflecting one of said formations or to be assembled therewith by means described hereafter.

Whereas in FIG. 3*a* the inner disc 45 containing the array 41*a* of image frames shown in FIG. 3 may be rotated or held while the outer disc 41 rotates differently therefrom by virtue of its sliding engagement in the V-shaped groove formation 42 formed at the inner edge of the outer disc, in FIG. 3*b*, a pair of annular circular washer-like members 47 and 48 are disposed so as to overlap the inner marginal portion of the outer disc 41B of the modified embodiment to provide a U-shaped channel-like retaining means for the inner disc 45B the peripheral marginal portion of which is retained within said channel in a manner to permit relative rotation of the two disc members. The abutting surfaces of members 47 and 48 may be bonded, welded or otherwise secured to the respective top and bottom surfaces of the outer disc 41B preferably after disposing the inner disc member therebetween. In the embodiments of FIGS. 3*a* and 3*b* both the circular lip formations 42A and 42B of the V-shaped groove formation 42 and the annular members 47, 48 may be made of a flexible plastic material such as polyvinyl chloride, polyethylene, polypropylene or other suitable polymer and so dimensioned as to permit the deflection of at least one of the lip formations or one of the circular formations in a manner to permit the respective inner disc members to be disposed within the channel or groove defined thereby without deformation of the formation beyond its elastic limit so that, in effect, the inner disc may be "snapped" into place and will be rotatable with respect to the outer disc as well as being assembled therewith as described. For example, in the embodiment illustrated in FIG. 3*a* if the lip formations 42A and 42B define conically formed shapes and are properly angled, one of said formations may be suitably deflected outwardly to permit the inner disc 45 to be inserted into the V-shaped groove.

In FIG. 3*c* is shown one means for forming the assembly 40 of FIG. 3. This disc member 41A is provided with a first cylindrically shaped lip 42' extending upwardly from one surface thereof around the inner edges of disc 41A and an extension 42" of the disc 41*a* against the outer periphery of the inner disc 45A is rested. Thereafter, a turning tool T, preferably heated, is brought to bear against the outer surface of lip 42" while either the tool or the disc rotates or in a compression stroke so as to turn cylindrical formation 42" inwardly to provide a channel as in FIG. 3 for rotationally supporting the inner disc 45A therein as described.

Figure 3D:
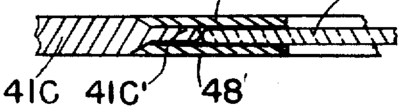

In FIG. 3*d* the outer disc 40C has an inner peripheral edge portion 41C' of reduced thickness which supports and is frictionally or weldably assembled with washers 47' and 48' which form a channel therewith for retaining the inner disc 45 as described.

It is noted that the described inner disc members 45, 45A, 45B and 45C of FIGS. 3 to 3*d* may be other than circular in peripheral shape as illustrated in the drawings. For example, substantially multi-point contact of the inner recording member with the circular groove of the outer disc member 41 may be derived to reduce friction and wear if the inner recording member is smaller in diameter than the groove and is provided with a plurality of spider-like protrusions or spokes during riding in said groove rather than the periphery of the disc. The disc 45 may also be rectangular or triangular in shape with the corners thereof engaged in the groove of the outer disc.

In FIG. 3*a'* is shown a circuit arrangement for controlling the operation of the stepping motor 28 shown in FIG. 2 or its equivalent motor 28' of FIG. 2' for controllably step rotating the turntable 18 to bring the next image frame into the optical projection field so that the images of the circular array of image frames may be properly described or otherwise accompanied by suitable reproductions of associated audio recordings. As noted above, audio tone signals are recorded at selected locations along the spiral record track of the audio signal disc and are reproduced by the tone pickup which passes such signals to an audio amplifier and then to a loud speaker. The signals are also passed through a band pass filter **28*d* which passes only the above audio control tone signals reproduced from the audio track and passes same to the stepping motor 28 which is operated thereby to step the turntable 18** at selected intervals during the reproduction of the audio recordings.

Whereas the electrical system, i.e., the power supply for energizing the projection system light source, the turntable operating solenoid 28 and the motor 22, is not shown, it should be obvious that any suitable power supply means may be provided and these components have been omitted only for purposes of simplifying the description of the instant invention. Likewise, it should be understood that the tone arm may be provided with a conventional audio amplifier and output speaker for the purpose of converting the vibrations of the tone arm cartridge (not shown) controlled by the recorded record groove into speaker vibrations and ultimately found in speech, music, or any other suitable form.

FIGS. 4 and 5 show alternative embodiments for the storage means and playback-display means of FIGS. 1 through 3*a*. As shown in FIG. 4, there is provided a record disk 50 having a first spiral groove 51 containing conventional audio information for tracking by the tone arm in the conventional manner. Immediately adjacent the spiral record groove 51 is a spiral track 52 comprised of a plurality of image frames substantially similar to a film strip but relatively smaller in overall dimensions. The disk 50 is provided with a central aperture 53 for location upon a turntable. The disk 10 may be printed or developed with image frames, T.P.R., or alternatively, may be provided with a spiral-shaped opening over which a spiral film strip is secured.

FIG. 5 shows the manner in which playback and display is carried out. As shown therein, there is provided a housing 60 having a base 61 and sidewalls 62 and 63. Whereas the housing may be completely enclosed, the remaining side and top walls have been omitted for purposes of clarity.

The base 61 supports a motor drive 64 for turntable 65. Motor 64 is provided with a shaft **64*a* for rotating turntable 66. The record disk 50 is positioned upon the turntable with the upper end of shaft 64*a* projecting through opening 53** of the disk.

The tone arm assembly 65 comprises a support 66 having an upwardly projecting rotatably mounted shaft 67 for supporting upper and lower arms 68 and 69, respectively. Upper arm 68 is provided with a cartridge (not shown) having a downwardly projecting needle 70 which rides in the spiral recording groove 51 so as to play back the sound signals recorded therein, as well as acting to guide the arms 68 and 69 to move from the outer periphery of the disk toward the center thereof as is conventional with record playback devices. Arms 68 and 69 are fixed with respect to each other.

The upper arm is further provided with a light source 71 for projecting light downwardly through the image frames of the spiral groove 52, which light is focussed by a suitable lens system and deflected by means to be more fully described so as to be projected upon a suitable display screen (not shown).

FIG. 6 shows a still further embodiment wherein the lower and upper arm 68 and 69 arrangement of FIG. 5 is replaced by a single arm 73 provided with a housing for a miniature TV camera, the mosaic of photoelectric cells, or, alternatively, optical means for scanning the spiral track. A light source 74 is secured to the tone arm for directing light rays upon the image frame material, which rays are reflected and picked up by the TV camera, photoelectric cell, or other optical means for visual display purposes.

As in the embodiment of FIG. 5, the embodiment of FIG. 6 is provided with a cartridge needle 70 which follows the sound record groove for the purpose of playing back the recorded sound, as well as acting as a guide means for the image scanning device. The image frames may be developed or printed in a sheet of film bonded or sealed to the disk; developed in a photosensitive coating on the disk, or the photoplastic disk itself, or may be thermoplastically developed as a ripple pattern on the disk for pickup by the optical scanning means.

FIG. 7 shows another alternative tone arm embodiment 80 comprised of a support member 81 rotatably supporting tone arm 82 by bearing means 83. The tone arm assembly 82 is provided with a lower depending arm 84 secured thereto by suitable fastening means 85 and having a light source and focusing lens housing 86 arranged at the forward end thereof so as to project light through the image frames provided in the spiral image groove.

As was previously the case, the tone arm assembly 82 is directed to move from the outer periphery of the disk toward the center thereof by a conventional playback cartridge stylus 87 which converts the undulations provided in the groove into electrical signals capable of ultimately driving a speaker system (not shown).

The light rays passing through the image frames are defocussed by a lens at 88 provided within a suitable opening in tone arm 82. These light rays move in the upward vertical direction so they impinge upon prism or mirror 89 which deflects the rays toward the left where they impinge upon a second prism or mirror 90 to again be deflected vertically upward through a focussing lens system 91 so as to be scanned or otherwise sensed by either a miniature TV camera in housing 94 or projection-optical system 92. For example, in the case of a projection-optical system, the apparatus may further be provided with a prism 92′ and focussing lens system 92″ for directing the light rays onto a suitable display screen 93.

FIG. 8 shows still another alternative embodiment for the tone arm assembly wherein the tone arm 82 is mounted for rotation upon support 81 by coupling means 83 in the same manner as was previously described. Also, the lower depending arm 84 is arranged in a manner substantially identical to that shown in FIG. 7. However, the arrangement of FIG. 8 is provided with a fiber optical bundle 94 comprised of a plurality of slender light-conducting pipes which extend either directly from the optical scanning system at location 95 or to the projection lens system to be more fully described, or, alternatively may begin at the surface of prism 89. The fiber optical bundle 94 is retained in a more or less cross-sectionally circular-shaped bundle by the retaining supports 96 and 96*a* which are suitably secured to at least one internal surface of the arm 82 and which are each provided with openings for receiving the fiber optical bundle therethrough.

The fiber optical bundle is bent at location 94*a* so as to direct the light rays vertically upward into the projection system.

Stationary coupling means 97 is secured around the upper end of the fiber optical bundle and further has a hollow interior for directing light rays into the projector housing 98 having a projection lens system 99 (which may include still another prism for bending light rays from the vertical to the horizontal direction) for projection upon a suitable display screen.

The fiber optical bundle 94 twists in the region of the bend 94*a*, as the arm 82 rotates to prevent image rotation. Image rotation may further be prevented by providing the prisms with suitable gear operating means so as to selectively rotate through predetermined angles as the arms rotate in order to maintain the projected image in the same attitude at all times.

It can clearly be seen from the foregoing description and drawings that the instant invention provides a novel storage means and playback-display means wherein both sound and video information may be stored within a single disk assembly and played back and displayed through the use of rather simple apparatus which is less complex in both design and use as compared with conventional systems which require more tedious loading and unloading operations. For example, conventional video tape requires the loading of a reel and the feeding of the forward strip of the tape through a capstan and recording head where it is eventually wound upon a take-up reel. A similar operation in reverse order occurs when the video tape is unloaded from the playback mechanism. Motion picture projection systems employing film strip also require a complex threading system and the film strip is subject to breakage and rapid wear in the act of being driven through a plurality of sprocket wheels. The disc shaped recording member of the instant invention is relatively simple to load for playback in that the disc need only be placed upon the turntable assembly and the tone arm positioned with its cartridge stylus within the sound recording record groove, which operation is simple and straightforward. In this connection, it is noted that the audiovisual apparatus defined herein and illustrated in the accompanying drawings may be subject to a number of design variations to improve or simplify its operation, viz:

I. Automatic record changing means may be provided to permit the selective or sequential changing of disc record members on the cooperating truntables from a stack or otherwise stored array of said records. Such record changing means may be provided in the same cabinet as the record playing means and may be constructed in accordance with conventional record changing apparatus modified so as to predeterminately locate the record disc during its storage and transfer so that the starting frame of the plurality of said frames of images to be selectively projected is predeterminately located when the record is loaded for playback. In an alternative arrangement for keying or synchronizing reproduction of the audio and the video or projectable recordings, a locating mark, recording or cut-out on the disc member containing the image frames or video information may be provided to effect such synchronization by automatically operating the turntable or drive means for the image disc to rotate same when the disc is first positioned thereon immediately after loading until said mark is scanned by limit switch means such as a photoelectric cell. The resulting signal derived from scanning said mark may be applied to activate the stop control of the motor or stepping solenoid to bring the turntable with the starting image frame in the scanning field of the projection light beam.

II. Conventional automatically operative means may be provided for retracting the tone arm 35 when a complete playing cycle has been completed in response to mechanical means operative when the tone arm reaches or approaches the innermost location of the spiral record groove or to scanning means scanning either of the two discs and generating control signals when recordings thereon are scanned which indicate end of recording. Manually operative push button switch control means may also be provided accessible to the exterior of the cabinet for retracting the tone arm to permit removal of the record disc prior to completion of complete playback. Control means in the form of a properly positioned limit switch having an actuator arm or a photoelectric scanner may also be provided to activate the motor means driving the tone arm into operative relationship with the record disc when a record disc is properly inserted into the housing. A slotted opening in a wall of the housing or cabinet and suitable guide means for the record disc may also be provided to permit the rapid insertion and removal of record discs.

III. Suitable cooling means, if necessary to dissipate the heat generated by the light source, such as one or more blowers may be provided in the housing for the described apparatus.

IV. Variations in the drive means for the two record discs assembled with each other are noted as follows. The outer record disc member 41 may be supported between one or more pairs of rotatable wheels compressively engaging same between the upper and lower surfaces thereof with at least one wheel being power driven and frictionally engaging the surface of the disc in a manner to cause its rotation as described. A single or plurality of pairs of such wheels may replace the outer turntable 25 of FIGS. 1 and 2. or may cooperate therewith in supporting and driving the disc.

V. Various modifications to the means for holding the inner disc on the inner turntable 18 while the outer disc rotates may be effected. For example, the disc engaging means 19 of FIG. 2 may be modified and may include suction means associated with the turntable or a solenoid mounted to the top wall 12 of the housing and operative to project its shaft to engage the upper surface of the inner disc. The same device may also be employed to selectively rotate the disc as described.

The clamping means for the inner disc may be eliminated if the shaft of the turntable is properly keyed or a hex shaft 19 is employed together with means for preventing rotation of the turntable, and the disc held by said shaft, during rotation of the outer disc.

VI. A monitoring screen for the projected images may be provided as part of or secured to the housing for the described audio-visual apparatus and operative to receive light modulated in passing through the images provided on the visual record disc member.

VII. Variations in the structure of the record disc are noted as follows:

a. If the circular array of image frames employed for still picture projection are provided on the outer disc member 41 as illustrated in FIG. 3; said outer disc member preferably overhangs the turntable driving same or is supported by the inner disc member and at least one pair of drive wheels engaging opposite faces of the border portion 41'' of the outer disc so as to permit light to be projected through the image frames 46' without interference.

b. The spiral audio recording groove **41*g* may be replaced by a spiral magnetic recording track on a flat surface of the disc or magnetic recording material disposed in a smooth spiral groove extending as illustrated at 41*g* in FIGS. 3 and 3'. By providing suitable magnetic recording and reproduction transducing means on a modified form of the tone arm 35** to be properly brought thereby into operative relationship with the spiral magnetic recording track, the operator may record and erase as well as playback his own audio recordings so as to describe the images which he may himself provide in the circular recording track of the image recording disc. The operator may provide suitable tone signals along said magnetic recording track to be reproduced and used to step the image recording disc at suitable points in the reproduction of the audio recordings on the magnetic track.

c. The single circular image frame recording track illustrated in FIG. 3 may be replaced by a plurality of concentric tracks on the same disc for increasing the number of stored images which may be scanned. In this connection, it is noted that the apparatus may include means for shifting the record disc when it is desired to bring an image frame existing on the next inner or outer circular track into the optical scanning field for passing projection light therethru. Such shifting of the record disc may be effected in response to the generation of a signal generated in scanning a mark indicating the end of recording or last frame of the circular track being scanned which may be effective in operating a servo-motor or solenoid connected to shift a platform mounting the described turntables and rotating means therefore.

d. The spiral track of image frames 52 illustrated in FIG. 4 may be replaced by a plurality of concentric record tracks of motion picture images with automatic means as described above for automatically stepping from one track to the next in scanning a continuous motion picture as described to provide a continuous motion picture image phenomena as the disc rotates. The stepping means may comprise shifting a scanning arm assembly containing the described electro-optical or television camera scanning means or may comprise shifting the location of the rotating record disc as described above, in response to an end-of-track signal generated in scanning the last image frame of a circular record track, so as to bring the next circular track into alignment with the optical projection system.

e. The image frames provided on the spiral track 52 of the record disc 50 of FIG. 4 may comprise micro-images developed or printed in the material of the disc or a film overlay laminated thereto. Said image frames may also comprise so called thermoplastic image recordings (T.P.R.) as defined in my said copending patent application wherein the projection or scanning system may include suitable Schlerein optics. The microimages may be in the order of 0.010 inch × 0.010 inch or less in dimension adapted to be scanned by light passed therethrough or reflected thereoff, to generate suitable motion picture images. The spiral groove 51 of FIG. 4 may be replaced by suitable audio optical recordings provided on a spiral track adjacent to along the spiral image track 52.

f. The individual image frames on the spiral track 52 may be replaced by an analog image strip which when scanned by suitable electro-optical means as described produces a variable analog signal which may be converted to motion picture or other information displaying phenomenon.

g. The spiral track 52 of FIG. 4 may also contain a series of document image frames to be selectively reproduced therefrom as may the described embodiments containing plural concentric tracks of microimages.

VIII. The outer turntables 25 of FIGS. 2 and 2' may be otherwise supported for rotation as described which may include a cylindrical wall or plurality of supports attached thereto and supported for rotation of the turntable by means of a circular track secured to the bottom wall 13 on which track wheels or roll bearings attached to said supports, ride to effect said rotation.

Although this invention has been described with respect to a number of its preferred embodiments, it should be understood that other variations and modifications may be resorted to which fall within the scope of the invention as claimed.

FIGS. 9 and 10 show structural details of a portion of a modified form of the described picture frame holding disc assembly having removable retaining means for the image frames so that the user of the apparatus and discs may assemble his own slides therewith. The accompanying audio signals recorded on the other disc which rotates continuously during use as the picture frame containing disc step rotates, may comprise a prerecorded musical composition or may be derived from a recording made by the user by means provided in FIG. 12 and described hereafter. The image frame containing disc 100 is made of an assembly of a disc shaped plastic base 101 containing either rectangular openings 102 therein or made of transparent plastic so that projection light may be passed through the image frames mounted on the disc. Removable assembly of each rectangular transparency or slide which may be produced by the user's own camera, is effected by means of a circular frame member 103 which is preferably a single circular array of slide frames comprising a single injection molding separate from the base 101 and bonded or welded thereto. The circular frame member 103 is composed of an outer strip portion 104 and an inner strip portion 105 joined by somewhat radially extending portions 106, each two of which define a separate frame portion beneath which a rectangular transparency or photograph made, for example, by an 8mm, 16mm or 35mm camera, may be inserted and retained thereby against base 101 for the purpose described. FIG. 10 shows a side cross sectional view taken radially through the disc 101 at section A—A and frame member 103 attached thereto. The inner circular strip portion 105 is welded to the upper surface of base 101 and serves as a stop for the rectangular transparent frame F inserted into the receptacle formed by base 101 and frame portions 104, 105 and 106 surrounding the opening 102 at the particular image frame location. The frame strip portion 104 between respective radial portions 106, is supported a distance above the upper surface of base 101 such that the spacing 103' therebetween will permit the user to slide assemble a rectangular transparency or slide photograph F therebeneath in a manner such that the slide transparency will be frictionally retained in its particular frame or pocket formed by the surrounding portions of the circular frame member 103. This may be effected in an improved manner by molding a small semi-spherical tit at the central portion of each strip portion 104 of each receptacle formed by the frame 103 and base 101 to engage slide F. The strip portion 104 is preferably slightly deflectable outwardly to permit the image frame transparency to be slideably moved in and out of its receptacle. The structure shown in FIGS. 9 and 10 may be modified as to the shape of the components thereof to provide essentially the same technique for assembling a plurality of image frame members in a circular array on a disc of the type required to effect the desired circular array of image frames.

In FIG. 11 is shown a modified form of image frame disc and separate removable assembly means for individual rectangular transparencies or photographs. The disc 110 is composed of an annular disc shaped base 111 having rectangular openings 113 therein disposed in a circular path about the rotational axis of the disc or the disc may be molded of transparent plastic. Disposed at each corner of each rectangular opening 113 is a pin-like protrusion 112 which is preferably molded integral with the base 111 and which preferably has a head portion of slightly larger diameter than the lower portions of said protrusions. Each image frame 46 is centered within the four pins 112 in alignment with an opening 113 by sighting or by means of a recess of slightly larger size than the image frame which recess may be molded in the upper surface of the base 111. Thereafter a rectangular frame 115 of molded plastic and having four holes 116 at its four corners, is aligned with the pins 112 and forced by hand towards the base 111 with each of the protrusions 112 entering a respective of the holes 116 therein. By forcefitting the frame 115 over the pin-like protrusions 112, said frame may be made to compressively engage the rectangular transparency F disposed therebeneath against the upper surface of base 111 so as to retain said frame thereagainst. In another construction, it is noted that the frame 115 may contain four pin-like protrusions molded integral therewith and protruding from a face thereof to engage in respective holes molded in the base 111 about the opening or image frame location thereof.

In FIG. 12 is shown a recording-play-back arrangement and disc record structure capable or providing audio recordings to be reproduced for the purposes described. In other words, the disc 120 of FIG. 12 is rotatably supported by the image frame bearing disc member such as either of those shown in FIGS. 9 or 11. The disc 120 contains a spiral groove 121 molded therein for guiding a needle or pin 132 protruding from a base 131 and forming part of the sound pick-up arm assembly 130 described. Disposed on the upper surface of the land portions 122 between the spiral groove 121 is a magnetic recording material 123 such as a magnetic oxide, chromium dioxide or the like provided as a coating thereon. Thus the pick-up arm assembly 130 is supported above the record disc 120 and guided inwardly as the pin or needle 132 follows the spiral groove 121. A magnetic transducer 133 is supported by the base 131 in a position to scan and transduce recording signals either fed thereto from a recording amplifier connected to a microphone or generated when the transducer is operating in the reproduction mode, by a magnetic recording provided along the spiral recording track defined by the upper surface of the land portion 122. In other words, conventional means may be provided for operating the transducer 133 in either the recording or the reproduction modes to effect the recording of audio signals on the spiral magnetic track of the disc 120 or the reproduction of previously recorded audio signals therefrom.

In FIG. 13 is shown a recording and reproduction arrangement for voice audio signals and the described image frame disc stepping control tone signals on the audio recording track 123 of the record member 120. The apparatus described is initiated in operation wherein an initial image frame or selected transparency is disposed in the optical scanning field of the projection system and the operator proceeds to describe the projected image by speaking into a microphone 140 energized by a power supply 144 and connected to a recording amplifier 141. The output of the recording amplifier 141 is connected through a bistable manual switch 145 to the recording input 146 of the transducer head 133 as it rides on spiral record track 133. A manually operated, normally open monostable switch 142 is secured to the microphone 140 or separately held in the hand of the operator and connects power supply 144 to a tone generator 143 which is operable when switch 142 is closed to generate and transmit a tone or frequency signal of the type described through closed switch 145 to the head 133 so that the operator may record the required switching signals along selected portions of the recording track 123 in accordance with the time direction of his particular description of the projected image.

For monitoring of the recorded audio-signals and operation of the disc stepping motor or solenoid 28, the switch 145 is opened and a second switch 147 is closed connecting power supply 144 with an input 148 to the transducing head 133 which energizes the signal reproducing coil thereof energizing the reproduction output 149 thereof which is connected to the reproduction amplifier 150. The output of amplifier 150 is connected both to a conventional speaker 151 and the described detector **28*d* for operating the stepping motor 28. Switches 145 and 147** may also be combined in a single multiple pole, multiple throw switch.

While the head 133 is shown as riding close to or against a portion of the spiral track 123 which is outward of that portion which is adjacent the needle or pin 132 it may also be directly behind the needle and riding on the land adjacent to that on which the needle is riding. The head 33 is made in accordance with conventional magnetic recording and/or reproduction transducer construcion.

While two separate electro mechanical drive means such as a motor and a solenoid, have been provided herein for separately driving the audio disc and stepping the image frame disc, it is noted that a single drive may be utilized to drive the audio disc at constant speed and, by means of suitable gears and levers may also be used to intermittently drive the disc containing the image frames at selected times in a reproduction cycle depending on the mechanism configuration. For example, equispaced teeth molded to the hub of the inner image frame disc may be intermittently engaged and driven to step rotate the disc thereof every predetermined number of rotations of the motor driving the audio disc at constant speed for the purpose described, by means of the same motor driving the audio disc. Pin-like protrusions from the image frame containing disc and molded integral therewith may be intermittently engaged by a suitable mechanism driven by the motor driving the audio disc at constant speed to intermittently step said image frame disc to bring successive frames thereof into the optical projection or viewing field. For example, conventional gears may form part of a gear down system driven by the shaft of the motor driving the audio disc at constant speed which gears pivotally operate a lever which intermittently engages projections or teeth molded integral with the image frame disc at its hub or spaced peripherally thereabout to intermittently step drive the disc and bring each frame into the projection field or the viewing field.

I claim:

1. An audio-visual apparatus comprising in combination:

a record disc assembly composed of concentrically arranged first and second disc members, means for rotatably supporting one of said disc members with respect to the other and means for separately power rotating both of said disc members about a common axis, a spiral groove formed in a first of said disc members, magnetic recording material defining a spiral track on said first disc member, said second disc member being provided with a plurality of image frame locations extending in a circular track which is concentric with said first disc member and means for removably securing at least one photographic image containing member at each of said frame locations, first means for rotating said first disc member at substantially constant speed, means for holding said second disc member from rotating while said first disc rotates, a projection optical system including means for projecting light through a selected frame of said second disc member, means for receiving said projected light and displaying an image of the frame photographic containing member scanned, means for selectively rotating said second disc member to selectively bring each of said photographic image containing members into the field of said projection optical system, a pivoted arm including a needle operative to ride in and follow the groove in said first disc member as said disc member rotates, a magnetic transducer supported by said pivoted arm and located thereon to scan said spiral magnetic track when said needle is riding in said spiral groove of said first disc member, amplifier and speaker means operatively connected to said magnetic transducer for generating audio playback of the recordings on said spiral magnetic track as said magnetic transducer reproduces signals therefrom, electrically operated means for causing said second disc member to step rotate to remove and replace one photographic image containing member disposed in the field of said projection optical system with the next photographic image containing member of said second disc, control means for said electrically operated means, and means for generating control signals as said first disc rotates for intermittently activating said control means and for synchronizing the operation of said first and second rotating means whereby selected portions of the sound produced from said magnetic track are generated while selected respective images are projected to said displaying means.

2. An audio-visual apparatus in accordance with claim 1 including means for selectively operating said magnetic transducer to either record signals on said spiral magnetic track or reproduce signals therefrom and means for modulating said magnetic transducer in the recording mode with audio information to be recorded on said spiral track.

3. An audio-visual apparatus in accordance with claim 2 wherein said modulating means includes a microphone, recording amplifying means connected to said microphone and selectively operable switching means for causing said transducer to operate in either the recording or reproduction mode.

4. An audio-visual apparatus in accordance with claim 1 wherein said magnetic recording material is disposed against areas of said first disc member provided between adjacent portions of said spiral groove and said magnetic transducer is located on said arm so as to scan said spiral track as the needle rides in the groove.

* * * * *